L. C. FREEMAN.
LUBRICATING APPARATUS.
APPLICATION FILED MAR. 19, 1913.
1,137,749.
Patented May 4, 1915.
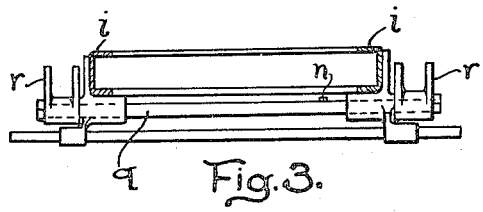
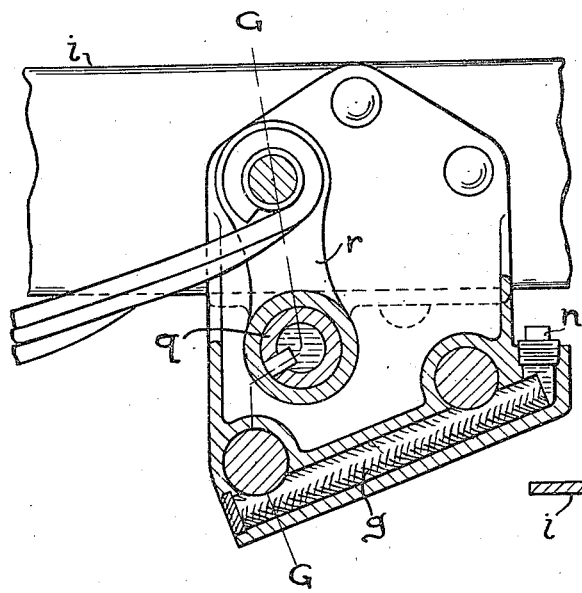
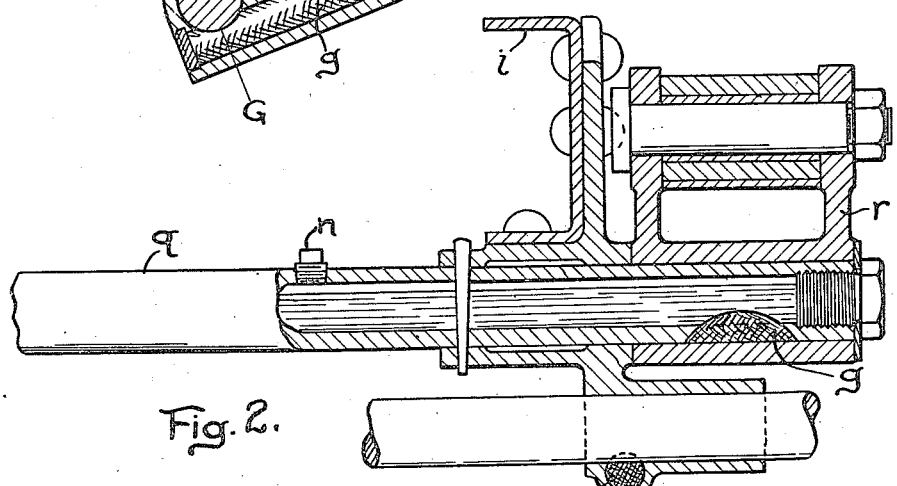
WITNESSES
INVENTOR
Lowell C. Freeman
BY
ATTORNEY

UNITED STATES PATENT OFFICE.

LOWELL C. FREEMAN, OF DETROIT, MICHIGAN.

LUBRICATING APPARATUS.

1,137,749.  Specification of Letters Patent.  Patented May 4, 1915.

Application filed March 19, 1913. Serial No. 755,382.

*To all whom it may concern:*

Be it known that I, LOWELL C. FREEMAN, a citizen of the United States, residing at Detroit, county of Wayne, State of Michigan, have invented a certain new and useful Improvement in Lubricating Apparatus, and declare the following to be a full, clear, and exact description of the same, such as will enable others skilled in the art to which it pertains to make and use the same, reference being had to the accompanying drawings, which form a part of this specification.

My invention relates to lubricating apparatus for automobile parts and consists in the improvements hereinafter described and pointed out in the claims.

In the accompanying drawings: Figure 1 is a detail elevation partly in section showing the arrangements adjacent to the attachment of each of the rear springs. Fig. 2 is an elevation broken away on the line G—G Fig. 1 looking from the left of said line. Fig. 3 is a detail elevation of the rear of the chassis, the side pieces of the frame being shown in section and the springs being removed.

$i\ i$ are the side pieces of the chassis.

$q$, is a tubular rod extending below the main frame transversely thereof and resting in bearings upon said frame.

$r, r$ are links to which the springs are pivotally secured, as shown most distinctly in Fig. 1. The lower ends of the links $r$ bear and oscillate upon the ends of the rod $q$ outside of the frame. In this case the wicking $g$ is made in the form of a Woodruff cotter, or key, and extends through a slot in the wall of the tubular rod $q$ from the interior of said rod to the bearing of the link or shackle $r$. The slot through which the wick $g$, through the wall of the rod $q$, extends, is not formed through the wall at the lower portion of said rod but at a slightly elevated position, as shown in Fig. 1, so that gravity will not entirely empty the tube. The filling opening is formed in the rod $q$ between the side pieces $i, i$ of the chassis where it is readily accessible, as indicated in Fig. 3, and the tube itself serves as a reservoir for the oil.

What I claim is:—

1. In an automobile, a tubular rod extending across the frame thereof, spring shackles secured and adapted to turn on said rod as a bearing, a slot extending from the interior of said rod to said bearing, and a wick occupying said slot.

2. In an automobile, a tubular rod extending across the frame thereof, spring shackles secured and adapted to turn on said rod as a bearing, a slot extending from the interior of said rod to said bearing, and a wick occupying said slot, said slot being formed through the wall of said rod above the lower portion of said rod.

3. In an automobile, a frame having side pieces, a tubular rod extending across said frame, spring shackles secured and adapted to turn on said rod as a bearing outside of said side pieces, a slot extending from the interior of said rod to said bearings, and a wick occupying said slot, and a filler opening extending through the wall of said rod between said side pieces.

In testimony whereof, I sign this specification in the presence of two witnesses.

LOWELL C. FREEMAN.

Witnesses:
 AGNES M. HIPKINS,
 ELLIOTT J. STODDARD.